(12) United States Patent
Kasaba et al.

(10) Patent No.: US 9,050,927 B2
(45) Date of Patent: Jun. 9, 2015

(54) CONTROL DEVICE FOR VEHICLE LAMP AND VEHICLE LAMP SYSTEM

(71) Applicants: Yusuke Kasaba, Shizuoka (JP); Masashi Yamazaki, Shizuoka (JP); Kazuo Goto, Shizuoka (JP); Atsushi Toda, Shizuoka (JP)

(72) Inventors: Yusuke Kasaba, Shizuoka (JP); Masashi Yamazaki, Shizuoka (JP); Kazuo Goto, Shizuoka (JP); Atsushi Toda, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 129 days.

(21) Appl. No.: 13/888,644

(22) Filed: May 7, 2013

(65) Prior Publication Data
US 2013/0308326 A1 Nov. 21, 2013

(30) Foreign Application Priority Data
May 17, 2012 (JP) .................. 2012-113783

(51) Int. Cl.
*B60Q 1/00* (2006.01)
*B60Q 1/10* (2006.01)
(52) U.S. Cl.
CPC ............ *B60Q 1/10* (2013.01); *B60Q 2300/112* (2013.01); *B60Q 2300/132* (2013.01)

(58) Field of Classification Search
CPC ...................... B60Q 2300/132; B60Q 1/10
USPC .................................... 362/465, 466
See application file for complete search history.

(56) References Cited

U.S. PATENT DOCUMENTS

| 2004/0246731 | A1* | 12/2004 | Hayashi et al. | 362/466 |
| 2005/0099818 | A1* | 5/2005 | Gropp et al. | 362/466 |
| 2012/0106179 | A1* | 5/2012 | Kasaba et al. | 362/465 |

FOREIGN PATENT DOCUMENTS

| JP | 2012-030782 A | 2/2012 |
| JP | 2012-030783 A | 2/2012 |

\* cited by examiner

*Primary Examiner* — Evan Dzierzynski
(74) *Attorney, Agent, or Firm* — Sughrue Mion, PLLC

(57) ABSTRACT

There is provided a control device for controlling a vehicle lamp. The device includes: a receiver configured to receive an output value from an inclination sensor; and a controller configured to control an optical axis of the vehicle lamp based on a vehicle attitude angle that is an inclination angle of the vehicle with respect to a road surface. The controller is configured to control the optical axis in a first optical axis control mode or a second optical axis mode, wherein an optical axis angle of the optical axis is adjusted in accordance with the vehicle attitude angle in the first optical axis mode, and the second optical axis control mode is different from the first optical axis control mode. The controller controls the optical axis in the second optical axis control mode, when the vehicle attitude angle is not included in a predetermined range.

4 Claims, 8 Drawing Sheets

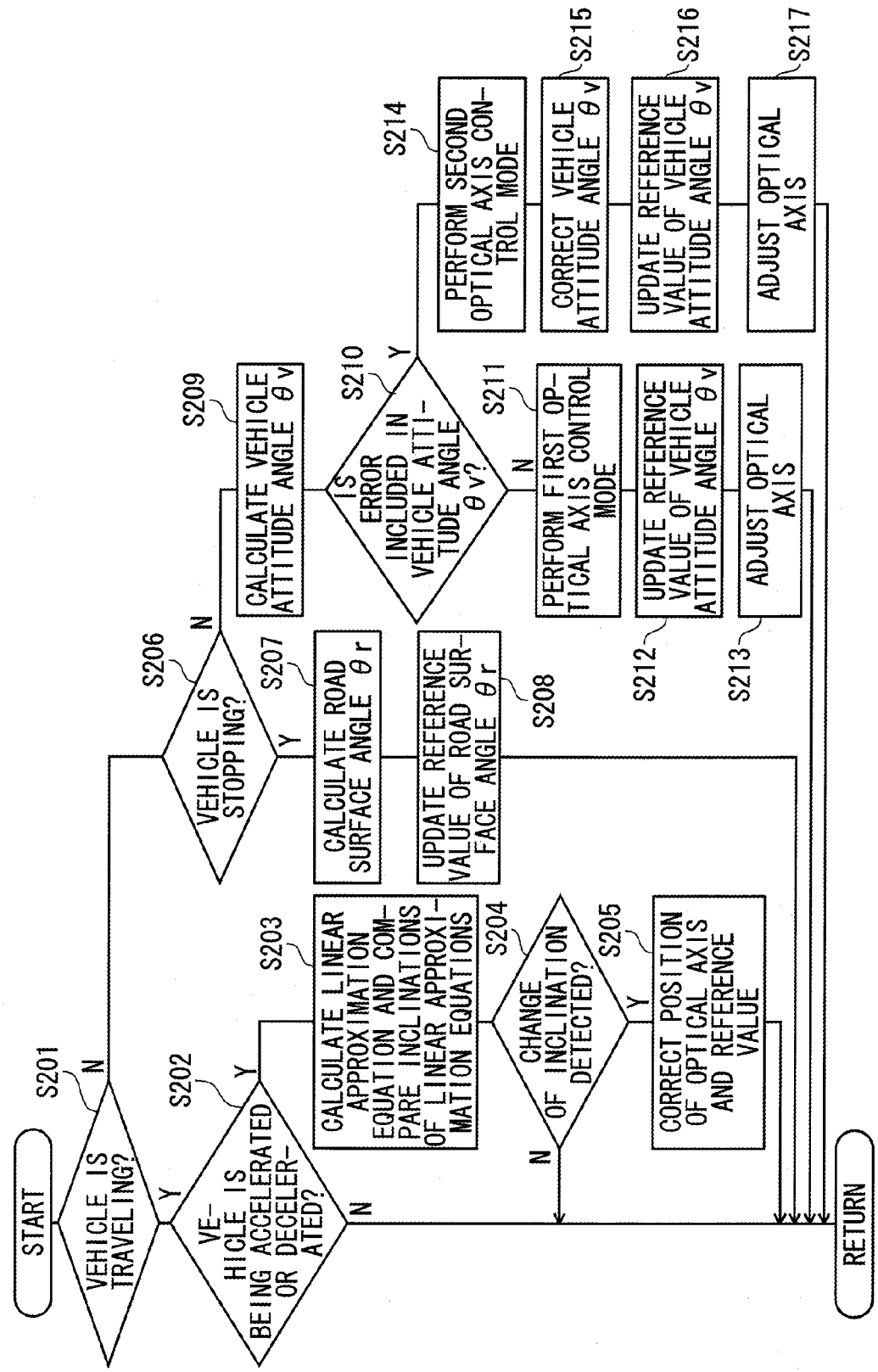

US 9,050,927 B2

CONTROL DEVICE FOR VEHICLE LAMP AND VEHICLE LAMP SYSTEM

CROSS-REFERENCE TO RELATED APPLICATION

This application claims priority from Japanese Patent Application No. 2012-113783, filed on May 17, 2012, the entire contents of which are hereby incorporated by reference.

BACKGROUND

1. Technical Field

The present disclosure relates to a control device for a vehicle lamp and a vehicle lamp system.

2. Related Art

Automatic leveling control, which changes an irradiation direction of a headlight by automatically adjusting the position of an optical axis of a vehicle headlight according to an inclination angle of a vehicle, has been known in the related art. Generally, in automatic leveling control, the position of an optical axis of a headlight is adjusted based on a pitch angle of a vehicle that is derived from an output value of a vehicle height sensor. Meanwhile, a control device for a vehicle lamp, which performs automatic leveling control using an inclination sensor such as an acceleration sensor, is disclosed in JP-A-2012-030782 and JP-A-2012-030783.

When an inclination sensor, such as an acceleration sensor, a gyro sensor (an angular velocity sensor or an angular acceleration sensor), or a geomagnetic sensor, is used, it is possible to reduce the weight of the automatic leveling system and to reduce the cost of an automatic leveling system as compared to the case where a vehicle height sensor is used. As a result, it is possible to reduce the cost and weight of a vehicle. On the other hand, there is a demand for performing automatic leveling control with high accuracy by reducing the influence that is caused by a detection error of a sensor or the like even when an inclination sensor such as an acceleration sensor is used.

Accordingly, as the result of the keen examination for the improvement of the accuracy of automatic leveling control, the inventors have perceived that there is room for further improvement of automatic leveling control in a control device for a vehicle lamp in the related art.

SUMMARY OF THE INVENTION

One of the present embodiments provide a technique that improves the accuracy of the automatic leveling control of a vehicle lamp.

According to one or more aspects of the present invention, there is provided a control device (100) for controlling a vehicle lamp (210) mounted in a vehicle (300). The device comprises: a receiver (102) configured to receive an output value from an inclination sensor (110) mounted in the vehicle (300); and a controller (104) configured to control an optical axis (O) of the vehicle lamp (210) based on a vehicle attitude angle ($\theta v$) that is an inclination angle of the vehicle with respect to a road surface, which is obtained from the output value. The controller (104) is configured to control the optical axis in a first optical axis control mode or a second optical axis mode, wherein an optical axis angle ($\theta o$) of the optical axis is adjusted in accordance with the obtained vehicle attitude angle ($\theta v$) in the first optical axis mode, and the second optical axis control mode is different from the first optical axis control mode. The controller controls the optical axis in the second optical axis control mode, when the obtained vehicle attitude angle ($\theta v$) or the optical axis angle ($\theta o$) corresponding to the obtained vehicle attitude angle ($\theta v$) is not included in a predetermined range (R1, R1') or when a difference between the obtained vehicle attitude angle and a previous vehicle attitude angle used in previous optical axis control or a difference between a position of the optical axis corresponding to the obtained vehicle attitude angle and a current position of the optical axis is larger than a predetermined threshold value (R2, R2').

According to one or more aspects of the present invention, there is provided a control device (100) for controlling a vehicle lamp (210) mounted in a vehicle (300). The device comprises: a receiver (102) configured to receive an output value from an inclination sensor (110) mounted in the vehicle (300); and a controller (104) configured to control an optical axis (O) of the vehicle lamp (210) based on a vehicle attitude angle ($\theta v$) that is an inclination angle of the vehicle with respect to a road surface, which is obtained from the output value, wherein the controller (104) is configured to: i) determine whether or not a predetermined error is included in the vehicle attitude angle ($\theta v$); and ii) control the optical axis in a second optical axis control mode which is different from a first optical axis control mode, wherein an optical axis angle ($\theta o$) of the optical axis is adjusted in accordance with the obtained vehicle attitude angle ($\theta v$) in the first optical axis mode, when the controller determines that the predetermined error is included in the vehicle attitude angle ($\theta v$).

Other aspects and advantages of the present invention will be apparent from the following description, the drawings and the claims.

BRIEF DESCRIPTION OF THE DRAWINGS

FIG. 8 is a flowchart of automatic leveling control that is performed by a control device for a vehicle lamp according to a second embodiment.

DETAILED DESCRIPTION

Figure 1:
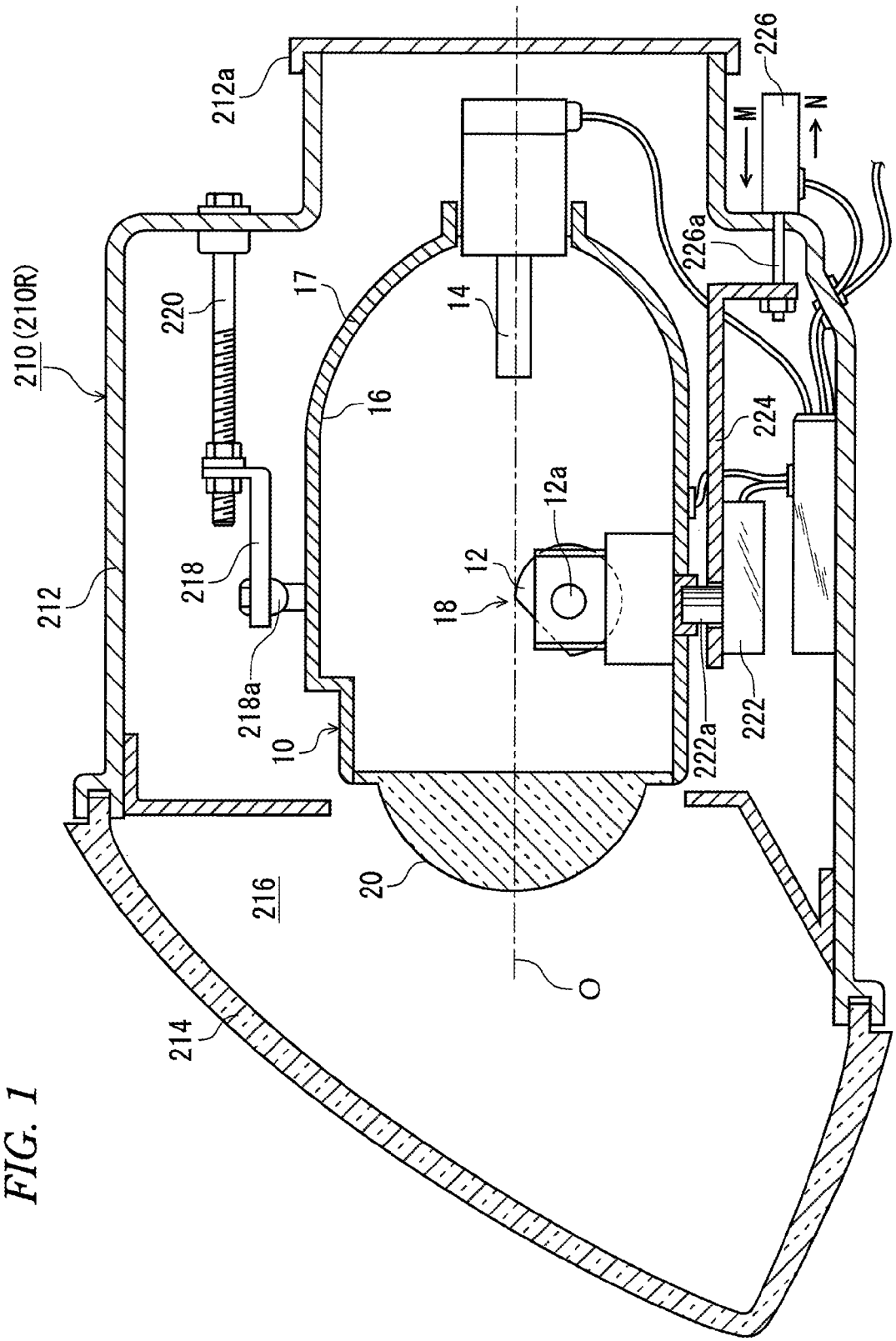
FIG. 1 is a schematic vertical cross-sectional view of a headlight unit including a vehicle lamp that is an object to be controlled by a control device according to a first embodiment.

Preferred embodiments of the invention will be described below with reference to the drawings. The same or equivalent elements, members, and processes, which are shown in the respective drawings, are denoted by the same reference numerals, and the repeated description thereof will be appropriately omitted. Further, the embodiments do not limit the invention, and is illustrative. The characteristics described in the embodiments or the combinations thereof are not necessarily essential in the invention.

First Embodiment

FIG. 1 is a schematic vertical cross-sectional view of a headlight unit including a vehicle lamp that is an object to be controlled by a control device according to a first embodiment. A pair of headlight units 210, which are symmetrical to each other, are disposed at the left and right portions of a vehicle in a vehicle width direction, respectively. Since the right headlight unit 210R and the left headlight unit 210L have substantially the same structure, the structure of the right headlight unit 210R will be described below. The headlight unit 210R includes a lamp body 212 and a translucent cover 214. The lamp body 212 includes an opening that is formed at the front portion thereof in the longitudinal direction of a vehicle. The translucent cover 214 covers the opening. The lamp body 212 includes a detachable cover 212a that is provided at the rear portion thereof in the longitudinal direction of the vehicle. A lamp chamber 216 is formed by the lamp body 212 and the translucent cover 214. A lamp unit 10 as a vehicle lamp is received in the lamp chamber 216.

A lamp bracket 218, which includes a pivot mechanism 218a serving as the swiveling center of the lamp unit 10 in vertical and lateral directions, is formed at the lamp unit 10. The lamp bracket 218 is threadably engaged with aiming adjustment screws 220 that are supported by the lamp body 212. A rotating shaft 222a of a swivel actuator 222 is fixed to the lower surface of the lamp unit 10. The swivel actuator 222 is fixed to a unit bracket 224. A leveling actuator 226 is connected to the unit bracket 224. The leveling actuator 226 is formed of, for example, a motor or the like that pushes and pulls a rod 226a in the directions of arrows M and N. When the rod 226a is pushed and pulled in the directions of the arrows M and N, the lamp unit 10 is in a backward inclined attitude and a forward inclined attitude. Accordingly, it is possible to perform leveling adjustment that makes the pitch angle of an optical axis O be directed to the upper side and the lower side.

The lamp unit 10 includes a shade mechanism 18 including a rotary shade 12, a bulb 14, a lamp housing 17 that supports a reflector 16 on the inner wall thereof, and a projection lens 20. An incandescent bulb, a halogen lamp, a discharge bulb, an LED, or the like may be used as the bulb 14. At least a part of the reflector 16 is formed in an ellipsoidal shape, and the reflector 16 reflects light that is emitted from the bulb 14. A part of the light emitted from the bulb 14 and the light reflected by the reflector 16 are guided to the projection lens 20 through the rotary shade 12. The rotary shade 12 is a cylindrical member that is rotatable about a rotating shaft 12a, and includes a cutout portion and a plurality of shade plates (not shown). Any one of the cutout portion and the shade plates is moved onto the optical axis O, so that a predetermined light distribution pattern is formed. The projection lens 20 is formed of a plano-convex aspheric lens, and projects a light source image, which is formed on the rear focal plane, onto a virtual vertical screen, which is formed in front of the lamp, as an inverted image.

Figure 2:
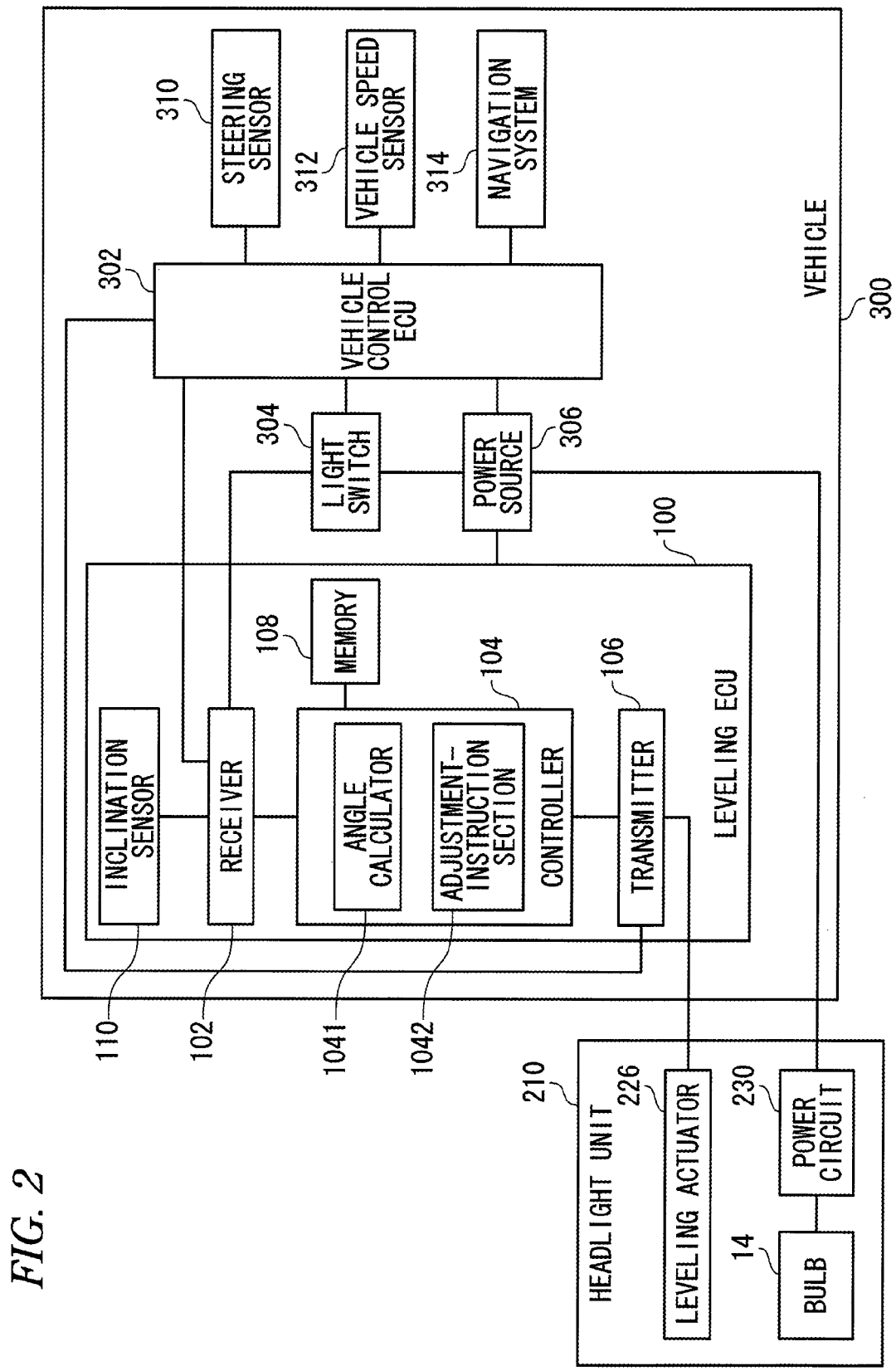
FIG. 2 is a functional block diagram illustrating the operational cooperation of the headlight unit, a vehicle control ECU, and a leveling ECU.

FIG. 2 is a functional block diagram illustrating the operational cooperation of the headlight unit, a vehicle control ECU, and a leveling ECU. Meanwhile, each of the headlight unit 210R and the headlight unit 210L is collectively represented as the headlight unit 210 in FIG. 2. Further, the leveling ECU 100 is realized by an element or a circuit including a CPU or a memory of a computer as hardware structure, and is realized by a computer program or the like as software structure. However, the leveling ECU is shown in FIG. 2 as functional blocks that are realized by the cooperation thereof. Accordingly, it is understood by those skilled in the art that these functional blocks may be realized in various ways by the combination of hardware and software.

The leveling ECU 100 as the control device for the vehicle lamp includes a receiver 102, a controller 104, a transmitter 106, a memory 108, and an inclination sensor 110. The leveling ECU 100 is installed near, for example, a dashboard of a vehicle 300. Meanwhile, the installation position of the leveling ECU 100 is not particularly limited, and may be provided in, for example, the headlight unit 210. Further, the inclination sensor 110 may be provided outside the leveling ECU 100. A vehicle control ECU 302 and a light switch 304 are connected to the leveling ECU 100. Signals, which are output from the vehicle control ECU 302 and the light switch 304, are received by the receiver 102. Further, the receiver 102 receives output values of the inclination sensor 110. The inclination sensor 110 of this embodiment is formed of an acceleration sensor.

A steering sensor 310, a vehicle speed sensor 312, a navigation system 314, and the like are connected to the vehicle control ECU 302. Signals, which are output from these sensors, are received by the receiver 102 of the leveling ECU 100 through the vehicle control ECU 302. The light switch 304 transmits a signal that instructs the headlight unit 210 to be turned on/off, a signal that instructs the automatic leveling control to be performed, and the like to a power source 306, the vehicle control ECU 302, the leveling ECU 100, and the like according to the operation of a driver.

A signal, which is received by the receiver 102, is transmitted to the controller 104. The controller 104 controls the optical axis O of the lamp unit 10 by using the inclination angle of the vehicle 300 that is obtained from the output values of the inclination sensor 110. More specifically, the controller 104 includes an angle calculator 1041 and an adjustment-instruction section 1042. The angle calculator 1041 generates pitch angle information of the vehicle 300 by using the information, which is stored in the memory 108, according to the output values of the inclination sensor 110 and need. The adjustment-instruction section 1042 generates an adjustment signal, which instructs the optical axis of the lamp unit 10 to be adjusted, by using the pitch angle information that is generated by the angle calculator 1041. The controller 104 outputs a control signal, which is generated by the adjustment-instruction section 1042, to the leveling actuator 226 from the transmitter 106. The leveling actuator 226 is driven based on the received adjustment signal, so that the optical axis O of the lamp unit 10 is adjusted in the direction of a pitch angle.

A power source 306, which supplies power to the leveling ECU 100, the vehicle control ECU 302, and the headlight unit 210, is mounted on the vehicle 300. When the turning-on of the headlight unit 210 is instructed by the operation of the light switch 304, power is supplied to the bulb 14 from the power source 306 through a power circuit 230.

Figure 3:
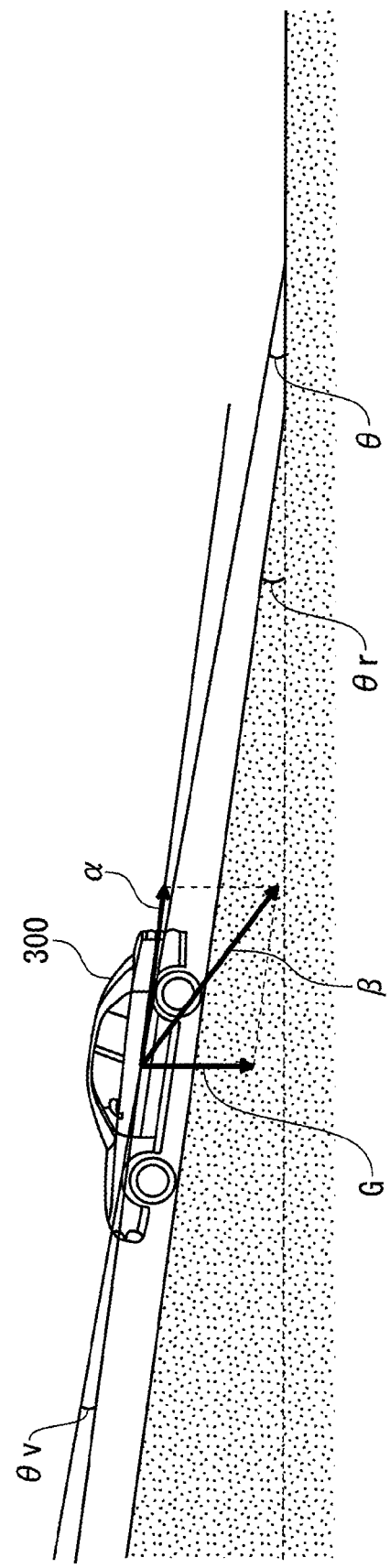
FIG. 3 is a schematic view illustrating an acceleration vector that is generated at a vehicle and an inclination angle of the vehicle that can be detected by an inclination sensor.
Figure 4A:
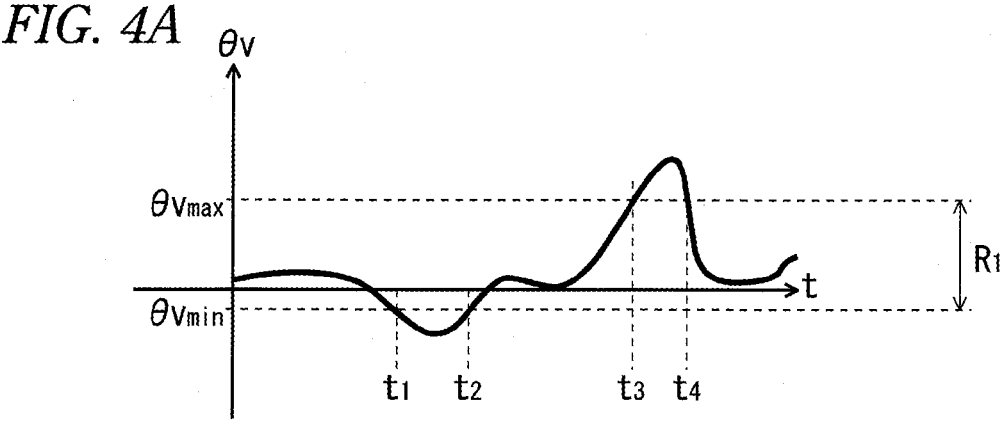
FIGS. 4A to 4D are views illustrating a second optical axis control mode that is performed by the control device for the vehicle lamp according to the first embodiment.
Figure 4B:
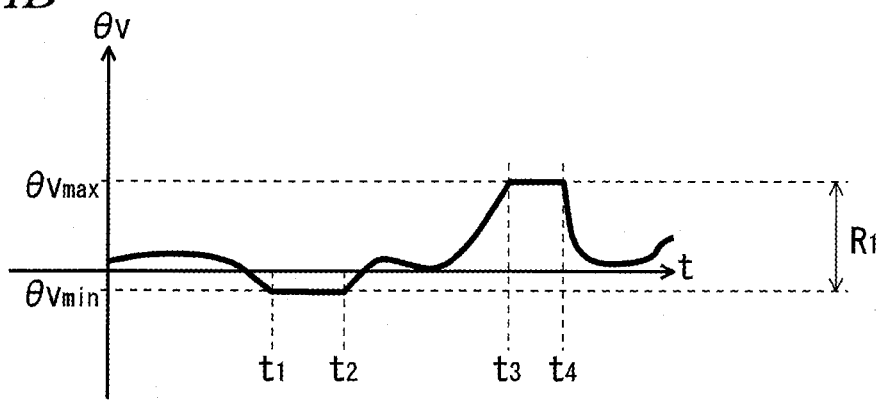
Figure 4C:
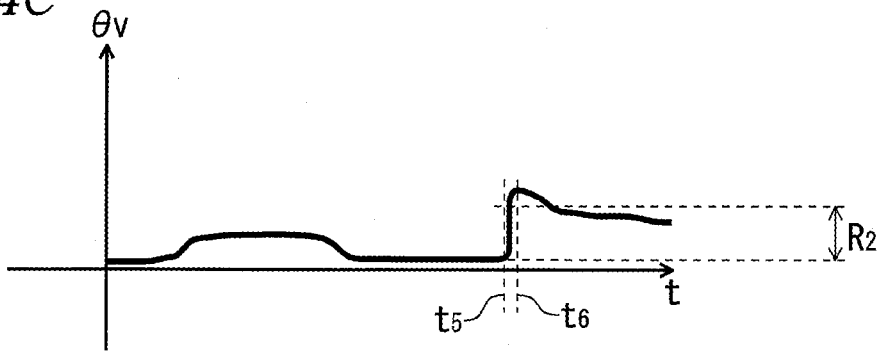
Figure 4D:
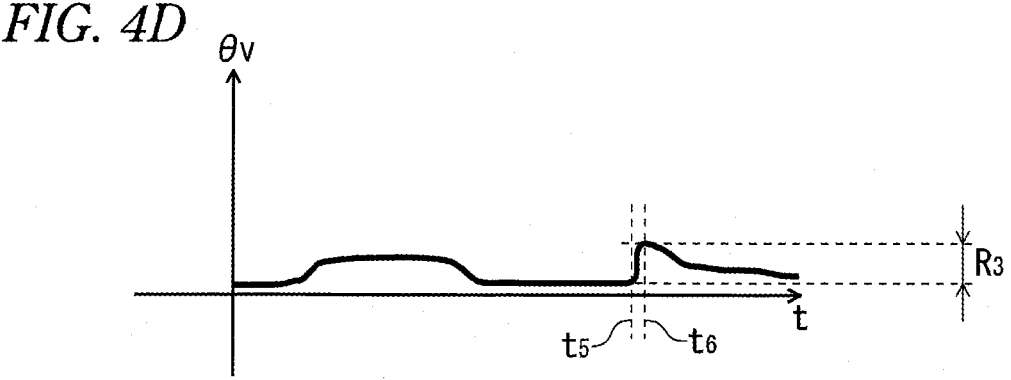

Subsequently, the automatic leveling control, which is performed by the leveling ECU 100 having the above-mentioned structure, will be described in detail. FIG. 3 is a schematic view illustrating an acceleration vector that is generated at a vehicle and an inclination angle of the vehicle that can be detected by the inclination sensor. FIGS. 4A to 4D are views illustrating a second optical axis control mode that is performed by the control device for the vehicle lamp according to the first embodiment. FIG. 4A is a timing diagram showing the temporal change of a calculated value of a vehicle attitude angle θv. FIG. 4B is a timing diagram showing the temporal change of a vehicle attitude angle θv of which the change is limited by a second optical axis control mode as an example, with respect to the calculated value of the vehicle attitude angle θv shown in FIG. 4A. FIG. 4C is a timing diagram showing the temporal change of a calculated value of the vehicle attitude angle θv. FIG. 4D is a timing diagram showing the temporal change of a vehicle attitude angle θv of which the change is limited by a second optical axis control mode as another example, with respect to the calculated value of the vehicle attitude angle θv shown in FIG. 4C. Vertical axes of FIGS. 4A and 4C represent the calculated value of the vehicle attitude angle θv, and vertical axes of FIGS. 4B and 4D represent the corrected value of the vehicle attitude angle θv. Horizontal axes of FIGS. 4A to 4D represent time t.

When a vehicle is a backward inclined attitude or a forward inclined attitude, the irradiation direction of the lamp unit 10 is also changed in the vertical direction, so that the range of light emitted forward increases or decreases. Further, the leveling ECU 100 derives the change of the inclination angle of the vehicle in a pitch direction from the output values of the inclination sensor 110, and uses the pitch angle of the optical axis O (hereinafter, this angle is appropriately referred to as an optical axis angle θo) as an angle that corresponds to the attitude of the vehicle. Even though the attitude of the vehicle is changed, it is possible to adjust the range of light, which is emitted forward, to an optimum distance by performing the automatic leveling control for performing the leveling adjustment of the lamp unit 10 in real time based on the attitude of the vehicle.

Here, the inclination sensor 110 is, for example, a three-axis acceleration sensor that has an X axis, a Y axis, and a Z axis perpendicular to one another. The inclination sensor 110 is mounted on the vehicle 300 with an arbitrary attitude, and detects an acceleration vector generated at the vehicle 300. Gravity acceleration and motion acceleration caused by the movement of the vehicle 300 are generated while the vehicle 300 is traveling. For this reason, as shown in FIG. 3, the inclination sensor 110 can detect a resultant acceleration vector β of a gravity acceleration vector G and a motion acceleration vector α. Further, while the vehicle 300 is stopped, the inclination sensor 110 can detect the gravity acceleration vector G. The inclination sensor 110 outputs numerical values of the respective X, Y, and Z-axis components of the detected acceleration vector. The numerical values of the respective X, Y, and Z-axis components, which are output from the inclination sensor 110, are converted into components, which correspond to a longitudinal axis, a lateral axis, and a vertical axis of the vehicle, by the controller 104.

It is possible to derive the inclination of the vehicle 300 with respect to the gravity acceleration vector G from the output values of the inclination sensor 110 while the vehicle is stopped. That is, from the output values of the inclination sensor 110, it is possible to derive the total angle θ that is the inclination angle of the vehicle with respect to the horizontal plane and includes a road surface angle θr, that is, the inclination angle of a road surface with respect to the horizontal plane and a vehicle attitude angle θv, that is, the inclination angle of the vehicle with respect to the road surface. Meanwhile, the inclination angle of the vehicle, which is required for the automatic leveling control, is the vehicle attitude angle θv. Accordingly, the controller 104 is adapted to calculate the vehicle attitude angle θv from the total angle θ and to control the optical axis O based on the obtained vehicle attitude angle θv. Meanwhile, the road surface angle θr, the vehicle attitude angle θv, and the total angle θ are the angles of the vehicle 300 in the pitch direction.

In this embodiment, the controller 104 estimates the change of the total angle θ, which is obtained while the vehicle is stopped, as the change of the vehicle attitude angle θv, and estimates the change of the total angle θ, which is obtained while the vehicle is stopped, as the change of the road surface angle θr. Since the vehicle attitude angle θv is rarely changed while the vehicle is traveling by the increase or decrease of the amount of load or the number of persons on the vehicle, it is possible to estimate the change of the total angle θ, which is obtained while the vehicle is traveling as the change of the road surface angle θr. Meanwhile, since the road surface angle θr is rarely changed while the vehicle is stopped by the movement of the vehicle 300, it is possible to estimate the change of the total angle θ, which is obtained while the vehicle is stopped, as the change of the vehicle attitude angle θv.

Further, the adjustment-instruction section 1042 of the controller 104 adjusts the optical axis with respect to the change of the total angle θ that is obtained while the vehicle is stopped, and avoids adjusting the optical axis with respect to the change of the total angle θ that is obtained while the vehicle is traveling. The adjustment-instruction section 1042 avoids the adjusting the optical axis by avoiding outputting an adjustment signal that instructs the optical axis to be adjusted or by generating and outputting a maintaining signal that instructs the position of the optical axis to be maintained. Meanwhile, the adjustment-instruction section may avoid outputting an adjustment signal by not generating the adjustment signal, and may avoid outputting the generated adjustment signal after the adjustment signal is generated.

Specifically, first, the vehicle 300 is placed on the horizontal plane, for example, at a vehicle maker's manufacturing plant, and this state is referred to as a reference state. Further, an initialization signal is transmitted to the leveling ECU 100 by the operation of a switch of an initialization processor, or the like. When receiving the initialization signal, the controller 104 starts initial aiming adjustment and adjusts the optical axis O of the lamp unit 10 to an initial set position. Furthermore, the controller 104 records the output values of the inclination sensor 110, when the vehicle 300 is in the reference state, in the memory 108 as the reference value (θr=0°) of the road surface angle θr and the reference value (θv=0°) of the vehicle attitude angle θv.

When the vehicle 300 is actually used, the adjustment-instruction section 1042 avoids adjusting the optical axis with respect to the change of the total angle θ that is obtained while the vehicle is traveling. Further, while the vehicle is stopping, the angle calculator 1041 obtains the road surface angle θr by subtracting the reference value of the vehicle attitude angle θv from the current total angle θ (which is obtained while the vehicle is stopping). Furthermore, the controller 104 keeps the obtained road surface angle θr in the memory 108 as a new reference value. Accordingly, the change of the total angle θ, which is estimated as the change of the road surface angle θr and obtained while the vehicle is traveling is incorporated into the reference value of the road surface angle θr. In the specification, the wording of "while the vehicle is traveling" is defined as the time, for example, until a detected value of the vehicle speed sensor 312 becomes 0 from when a detected value of the vehicle speed sensor 312 exceeds 0. The wording of "while the vehicle is stopping" is defined as the time when the output values of the inclination sensor 110 become stable after, for example, a detected value of the vehicle speed sensor 312 becomes 0.

While the vehicle is stopped, the angle calculator 1041 calculates the current total angle θ from the acceleration that is detected by the inclination sensor 110, and obtains a vehicle attitude angle θv by subtracting the reference value of the road surface angle θr from the obtained total angle θ. The obtained vehicle attitude angle θv is stored in the memory 108 as a new reference value. Moreover, the adjustment-instruction section 1042 adjusts the optical axis O by using the updated reference value of the vehicle attitude angle θv. For example, the adjustment-instruction section 1042 determines an optical axis angle θo by using a conversion table which is previously recorded in the memory 108 and in which a vehicle attitude angle θv and an optical axis angle θo correspond to each other, and adjusts the optical axis O so that the optical axis angle θo becomes this optical axis angle θo. This optical axis adjustment is a control mode that is performed in normal optical axis control, and the optical axis O is controlled so as to form the optical axis angle θo corresponding to the calculated vehicle attitude angle θv (an optical axis angle θo corresponding to the vehicle attitude angle θv one to one). Hereinafter, this control mode is appropriately referred to as a first optical axis control mode. The wording of "while the vehicle is stopped" is defined as the time, for example, until a detected value of the vehicle speed sensor 312 exceeds 0 from when the output values of the inclination sensor 110 are stable.

The leveling ECU 100 of this embodiment has a first optical axis control mode and a second optical axis control mode that is a mode different from the first optical axis control mode and is performed at the time of fail safe to be described below. The second optical axis control mode is a mode limiting the adjustment of the optical axis O. Information about the first and second optical axis control modes is stored in the memory 108. The adjustment-instruction section 1042 of the controller 104 determines whether or not an inclination angle obtained from the output values of the inclination sensor 110, here, the vehicle attitude angle θv calculated by the angle calculator 1041 includes a predetermined error. When the adjustment-instruction section 1042 determines that the vehicle attitude angle θv includes the predetermined error, the adjustment-instruction section 1042 performs the second optical axis control mode. In other words, the determination of whether or not the vehicle attitude angle θv includes the predetermined error is the determination of whether or not an optical axis control mode to be performed is set to the first optical axis control mode or the second optical axis control mode. The predetermined error is, for example, a calculation error of the inclination sensor 110 or a detection error of the inclination sensor 110, and includes an error that is caused by, for example, quantization errors (quantum errors), the accumulation thereof, the failure of the inclination sensor 110, the separation of the inclination sensor 110 from a substrate, the shift of the fixed position, or the like.

The adjustment-instruction section 1042 of the controller 104 determines whether or not a predetermined error is present, for example, in the following manner. That is, a predetermined range $R_1$ of the vehicle attitude angle θv, which is a criterion for determining whether or not the predetermined error is present, is determined in advance and is stored in, for example, the memory 108. Further, the adjustment-instruction section 1042 determines that the vehicle attitude angle θv includes the predetermined error when the vehicle attitude angle θv obtained from the output values of the inclination sensor 110 is not included in the predetermined range $R_1$. FIG. 4A shows a state where the calculated value of the vehicle attitude angle θv is smaller than a lower limit θvmin of the predetermined range $R_1$ between time $t_1$ and time $t_2$ and the calculated value of the vehicle attitude angle θv is larger than an upper limit θvmax of the predetermined range $R_1$ between time $t_3$ and time $t_4$.

In this case, in the second optical axis control mode, optical axis control is performed in the following manner as an example. That is, when the calculated value of the vehicle attitude angle θv is larger than the upper limit θvmax of the predetermined range $R_1$, the adjustment-instruction section 1042 corrects the calculated value of the vehicle attitude angle θv to the upper limit θvmax of the predetermined range $R_1$ and adjusts the angle of the optical axis O based on this corrected value. Further, when the calculated value of the vehicle attitude angle θv is smaller than the lower limit θvmin of the predetermined range $R_1$, the adjustment-instruction section 1042 corrects the calculated value of the vehicle attitude angle θv to the lower limit θvmin of the predetermined range $R_1$ and adjusts the optical axis O based on this corrected value. FIG. 4B shows a state where the calculated value of the vehicle attitude angle θv is corrected to the lower limit θvmin of the predetermined range $R_1$ between time $t_1$ and time $t_2$ and the calculated value of the vehicle attitude angle θv is corrected to the upper limit θvmax of the predetermined range $R_1$ between time $t_3$ and time $t_4$.

The "predetermined range $R_1$" is determined based on the vehicle attitude angle θv that is acquired while the vehicle 300 is used. For example, the predetermined range $R_1$ is determined based on vehicle design values that include the maximum value and the minimum value of a vehicle height, the movable range of a suspension, a wheelbase, and the like. That is, the predetermined range $R_1$ can be determined based on the movable range of the vehicle 300 in the direction of a pitch angle that is determined according to the mechanical structure of the vehicle 300. For example, the movable range of the vehicle 300 is the predetermined range $R_1$. In this case, the upper limit θvmax may be set to, for example, 5% (an angle that allows the longitudinal axis of the vehicle 300 to rise by 5 m at a position 100 in ahead), and the lower limit θvmin may be set to, for example, −0.5% (an angle that allows the longitudinal axis of the vehicle 300 to be lowered by 0.5 m at a position 100 m ahead). Further, the predetermined range $R_1$ may be set to the movable range of the vehicle 300 that has a positive margin for allowing the range to be corrected so that the range is widened, and may also be set to the movable range of the vehicle 300 that has a negative margin for allowing the range to be corrected so that the range is narrowed.

Furthermore, the predetermined range $R_1$ may be determined based on the range of the vehicle attitude angle θv that is estimated in consideration of the weight of persons or the like getting on the vehicle, the number of persons getting on the vehicle, the weight of baggage loaded on the vehicle, the load capacity, and the like and is generally acquired from the vehicle 300. Moreover, the predetermined range $R_1$ may be determined based on an experimental value. That is, the vehicle attitude angle θv, which is acquired when the vehicle 300 is actually used, is measured and the predetermined range $R_1$ can be set from the result of the measurement. The above-mentioned margin can be set even for the range of the experimental value or the vehicle attitude angle θv to be generally acquired. As for the correction of the calculated value of the vehicle attitude angle θv, a calculated value exceeding the upper limit θvmax may be corrected to a value smaller than the upper limit θvmax and a calculated value smaller than the lower limit θvmin may be corrected to a value larger than the lower limit θvmin.

Alternatively, the adjustment-instruction section 1042 of the controller 104 determines whether or not a predetermined error is present, for example, in the following manner. That is, a predetermined threshold value $R_2$ of the variation of the vehicle attitude angle θv, which is a criterion for determining whether or not the predetermined error is present, is determined in advance and is stored in, for example, the memory 108. The angle calculator 1041 calculates a difference between the vehicle attitude angle θv that is obtained from the output values of the inclination sensor 110 and the vehicle attitude angle θv that is used in the previous optical axis control, that is, a difference between the calculated value of the vehicle attitude angle θv and a reference value of the vehicle attitude angle θv that is stored in the memory 108. Further, when the obtained difference, that is, the variation of the vehicle attitude angle θv is larger than a predetermined threshold value $R_2$, the adjustment-instruction section 1042 determines that the vehicle attitude angle θv includes the predetermined error. FIG. 4C shows a state where a difference between the vehicle attitude angle θv calculated at time $t_6$ and the vehicle attitude angle θv corresponding to time $t_5$ when the previous optical axis control is performed is larger than the predetermined threshold value $R_2$.

In this case, in a second optical axis control mode, optical axis control is performed in the following manner as an example different from the above-mentioned second optical axis control mode. That is, an upper limit $R_3$ of the variation of the vehicle attitude angle θv is determined in advance and is stored in, for example, the memory 108. Moreover, the adjustment-instruction section 1042 connects the variation of the vehicle attitude angle θv to the upper limit $R_3$, and controls the optical axis O by using the vehicle attitude angle θv that is obtained from this correction. In FIG. 4D, the vehicle attitude angle θv calculated at the time $t_6$ is corrected to a value that is obtained by adding the upper limit $R_3$ to the vehicle attitude angle θv corresponding to the time $t_5$.

The "predetermined threshold value $R_2$" is determined based on the variation of the vehicle attitude angle θv that is acquired while the vehicle 300 is used. For example, the predetermined threshold value $R_2$ can be determined based on the above-mentioned vehicle design values. For example, a difference between the upper and lower limits of the movable range of the vehicle 300, which is determined according to the mechanical structure of the vehicle 300, is the predetermined threshold value $R_2$. Further, the predetermined threshold value R2 may be determined based on the range of the vehicle attitude angle θv that is estimated in consideration of the weight of persons or the like getting on the vehicle, the number of persons getting on the vehicle, the weight of baggage loaded on the vehicle, the load capacity, and the like and is generally acquired from the vehicle 300; and may be determined based on an experimental value. Furthermore, the above-mentioned margin can also be set for the predetermined threshold value. The "upper limit $R_3$" may be set to a value equal to the predetermined threshold value $R_2$ and may be set to a value smaller than the predetermined threshold value $R_2$. Moreover, the upper limit $R_3$ may be determined based on calculate variation. For example, the upper limit $R_3$ may be set to several tens of percent of calculated variation.

The determinations of whether or not the above-mentioned different kinds of errors are present may be used alone and the combination thereof may be used. Likewise, the above-mentioned different kinds of second optical axis control modes may also be used alone and the combination thereof may also be used.

Meanwhile, in the determination of whether or not the above-mentioned error is present, the vehicle attitude angle θv has been used as an object to be determined but the optical axis angle corresponding to the calculated vehicle attitude angle θv may be used as an object to be determined. That is, when an optical axis angle θo obtained from a calculated value of the vehicle attitude angle θv is not included in a predetermined range $R_1'$ corresponding to the predetermined range $R_1$ or when a difference between the position of the optical axis corresponding to a calculated value of the vehicle attitude angle θv and the current position of the optical axis (that is, the position of the optical axis having been adjusted by the previous optical axis control) is larger than a predetermined threshold value $R_2'$ corresponding to the predetermined threshold value $R_2$, the adjustment-instruction section 1042 may perform the second optical axis control mode.

In this case, each of the vertical axes of FIGS. 4A and 4C is replaced by an optical axis angle θo and each of the vertical axes of FIGS. 4B and 4D is replaced by the corrected optical axis angle θo. Further, the predetermined range $R_1$ is replaced by the predetermined range $R_1'$ and the predetermined threshold value $R_2$ is replaced by the predetermined threshold value $R_2'$. The upper limit $R_3$ is replaced by an upper limit $R_3'$, which corresponds to the upper limit $R_3$, of the variation of the optical axis O. The predetermined range $R_1'$ is determined based on the optical axis angle θo corresponding to the vehicle attitude angle θv that is acquired while the vehicle 300 is used. The predetermined threshold value $R_2'$ is determined based on the variation of the optical axis angle θo corresponding to the variation of the vehicle attitude angle θv that is acquired while the vehicle 300 is used. Like the upper limit $R_3$, the upper limit $R_3'$ can be determined based on the predetermined threshold value $R_2'$, the calculated variation of the optical axis O, or the like.

In the second optical axis control mode, the following method other than the above-mentioned method may be used as a method of limiting the adjustment of the optical axis O. For example, when it is determined that the vehicle attitude angle θv includes a predetermined error, the current optical axis angle θo may be maintained by the avoidance of the adjustment of the optical axis O and the next optical axis control may be prepared. Further, the optical axis O may be displaced to the initial set position, other reference positions, the lowermost position of the movable range of the optical axis O, and the like. Furthermore, the optical axis control may be stopped after the optical axis O is fixed to the upper limit θvmax or the lower limit θvmin of the predetermined range $R_1$, the initial set position, other reference positions, the lowermost position of the movable range of the optical axis O, and the like. The stop of the optical axis control is performed by the stop of the calculation of the vehicle attitude angle θv, the avoidance of the output of an adjustment signal, the output of a maintaining signal, the stop of the generation of an adjustment signal, or the like.

As described above, when determining that the vehicle attitude angle θv calculated by the inclination sensor 110 includes a predetermined error, the controller 104 performs the second optical axis control mode that is a mode different from the first optical axis control mode performed at the normal time and inhibits a predetermined error from being included in the optical axis control. For this reason, it is possible to suppress the shift of the position of the optical axis that is caused by the predetermined error. As a result, it is possible to improve the accuracy of the automatic leveling control.

Meanwhile, in the above description, the adjustment-instruction section 1042 has determined whether or not a predetermined error is included in the vehicle attitude angle θv (inclination angle) obtained from the output values of the inclination sensor 110 and performs the second optical axis control mode. However, the leveling ECU 100 of this embodiment also includes a structure that performs the second optical axis control mode when the vehicle attitude angle θv obtained from the output values of the inclination sensor 110 or the optical axis angle corresponding to the vehicle attitude angle θv is not included in the predetermined range $R_1$. Further, the leveling ECU 100 of this embodiment also includes a structure that performs the second optical axis control mode when a difference between the vehicle attitude angle θv obtained from the output values of the inclination sensor 110 and the vehicle attitude angle θv used in the previous optical axis control or a difference between the position of the optical axis corresponding to the vehicle attitude angle θv obtained from the output values of the inclination sensor 110 and the current position of the optical axis is larger than the predetermined threshold value $R_2$.

Figure 5:
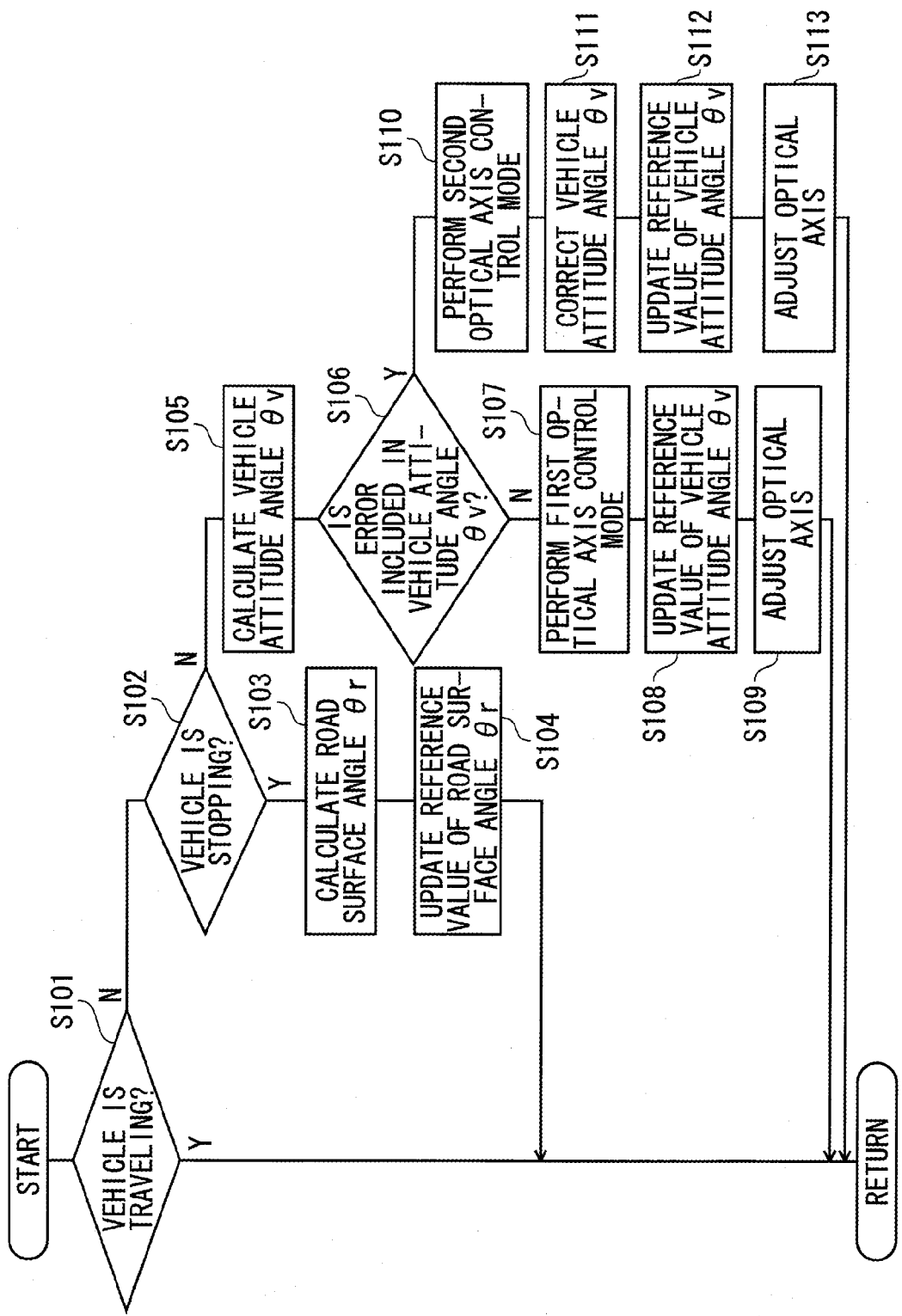
FIG. 5 is a flowchart of automatic leveling control that is performed by the control device for the vehicle lamp according to the first embodiment.

FIG. 5 is a flowchart of the automatic leveling control that is performed by the control device for the vehicle lamp according to the first embodiment. In the state where the automatic leveling control mode is instructed to be performed by, for example, the light switch 304, this flow is repeatedly performed at a predetermined timing by the controller 104 when an ignition is turned on and is ended when ignition is turned off.

First, the controller 104 determines whether or not the vehicle is traveling (S101). If the vehicle is traveling (Y ("Yes") in S101), the controller 104 avoids adjusting the optical axis and ends this routine. If the vehicle is not traveling (N ("No") in S101), the controller 104 determines whether or not the vehicle is stopping (S102). If the vehicle is stopping (Y in S102), the controller 104 calculates the road surface angle θr by subtracting the reference value of the vehicle attitude angle θv from the current total angle θ (S103) and updates the calculated road surface angle θr as a new reference value (S104). After that, the controller 104 avoids adjusting the optical axis and ends this routine.

If the vehicle is not stopping (N in S102), this case means that the vehicle is stopped and the controller 104 calculates the vehicle attitude angle θv by subtracting the reference value of the road surface angle θr from the current total angle θ (S105). Further, the controller 104 determines whether or not a predetermined error is included in the calculated vehicle attitude angle θv (S106). If an error is not included in the calculate vehicle attitude angle θv (N in S106), the controller 104 performs the first optical axis control mode (S107) and updates the calculated vehicle attitude angle θv as a new reference value (S108). Furthermore, the controller 104 adjusts the optical axis based on the updated reference value of the vehicle attitude angle θv (S109), and ends this routine.

If an error is included in the calculated vehicle attitude angle θv (Y in S106), the controller 104 performs the second optical axis control mode (S110) and corrects the calculated vehicle attitude angle θv (S111). Moreover, the controller 104 updates this corrected value as a new reference value (S112). Further, the controller 104 adjusts the optical axis based on the updated reference value of the vehicle attitude angle θv (S113) and ends this routine.

The wordings of "while the vehicle is traveling", "while the vehicle is stopping", "while the vehicle is stopped", "predetermined range $R_1$", "predetermined range $R_1'$", "predetermined threshold value $R_2$", "predetermined threshold value $R_2'$", "upper limit $R_3$", and "upper limit $R_3'$" may be appropriately set based on experiments or simulations that are performed by an engineer.

As described above, the controller 104 of the leveling ECU 100 as the control device for the vehicle lamp according to this embodiment determines whether or not the vehicle attitude angle θv obtained from the output values of the inclination sensor 110 includes a predetermined error, and performs the second optical axis control mode when determining that the vehicle attitude angle θv includes the predetermined error. Alternatively, the controller 104 performs the second optical axis control mode when the vehicle attitude angle θv obtained from the output values of the inclination sensor 110 or the optical axis angle θo corresponding to the vehicle attitude angle θv is not included in the predetermined ranges $R_1$ and $R_1'$. Alternatively, the controller 104 performs the second optical axis control mode when a difference between the vehicle attitude angle θv obtained from the output values of the inclination sensor 110 and the vehicle attitude angle θv used in the previous optical axis control or a difference between the position of the optical axis corresponding to the vehicle attitude angle θv obtained from the output values and the current position of the optical axis is larger than the predetermined threshold values $R_2$ and $R_2'$. Accordingly, it is possible to improve the accuracy of the automatic leveling control using the acceleration sensor 110.

Second Embodiment

A control device for a vehicle lamp according to a second embodiment is common to the structure of the leveling ECU 100 according to the first embodiment except that a control for correcting for the optical axis angle is performed by using a ratio between the temporal variation of the longitudinal acceleration of the vehicle and the temporal variation of the vertical acceleration of the vehicle that are obtained from sensor values at the time of the acceleration or deceleration of the vehicle. The structure of a leveling ECU 100 according to the second embodiment, which is different from that of the first embodiment, will be mainly described below.

Figure 6A:
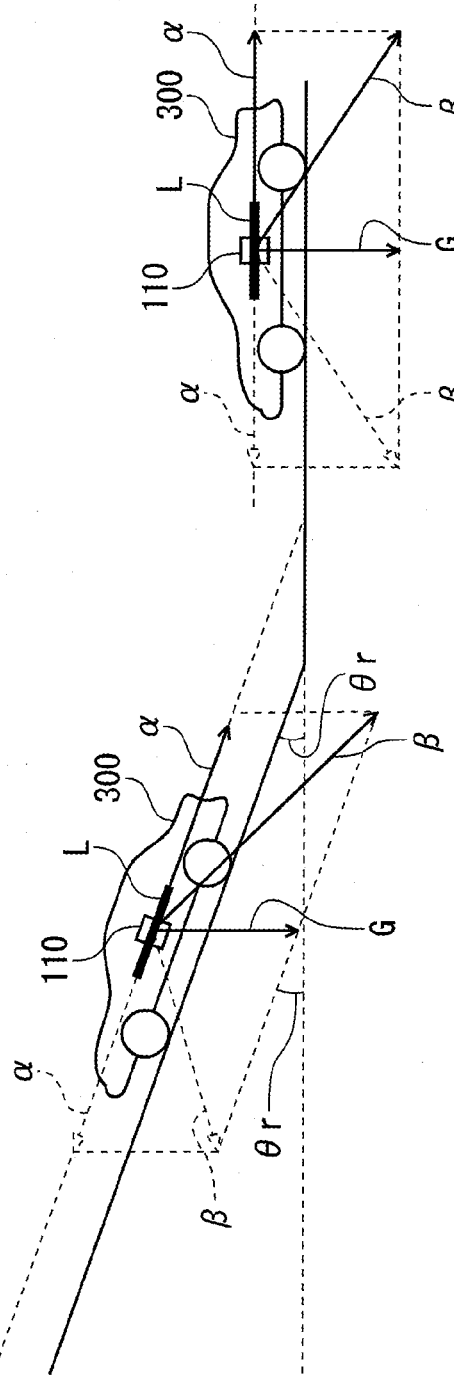
FIGS. 6A and 6B are schematic views illustrating a relationship between the direction of a motion acceleration vector of the vehicle and a vehicle attitude angle.
Figure 6B:
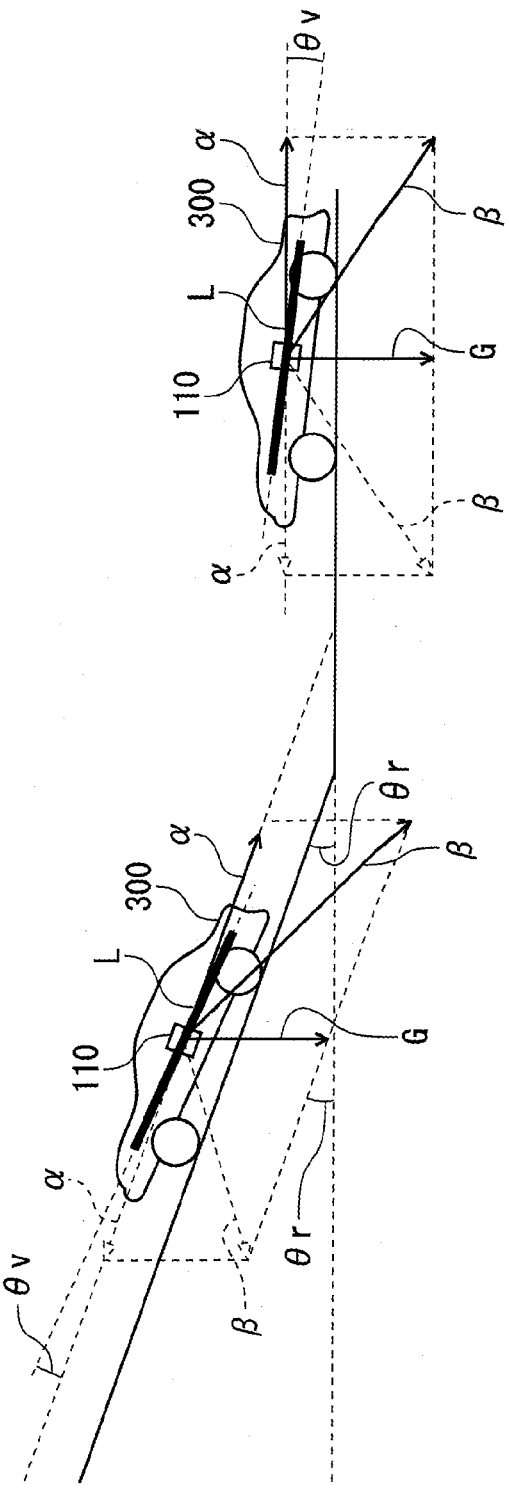
Figure 7:
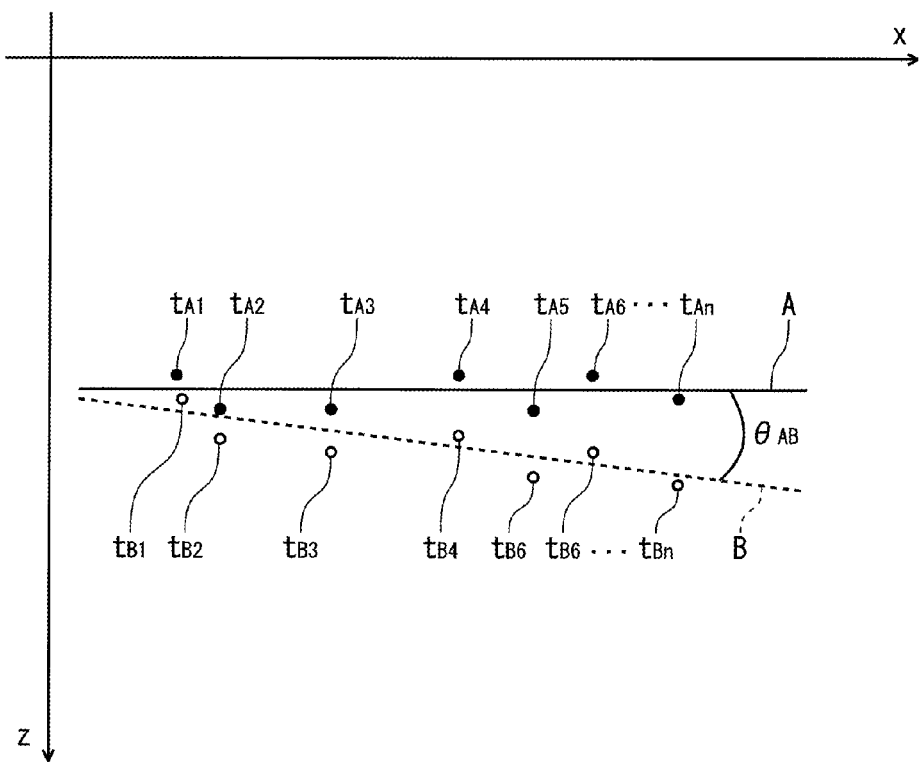
FIG. 7 is a graph showing a relationship between the longitudinal acceleration of the vehicle and the vertical acceleration of the vehicle.

FIGS. 6A and 6B are schematic views illustrating a relationship between the direction of a motion acceleration vector of the vehicle and a vehicle attitude angle. FIG. 6A shows a state where a vehicle attitude angle θv is not changed, and FIG. 6B shows a state where a vehicle attitude angle θv is changed. Further, in FIGS. 6A and 6B, a motion acceleration vector α and a resultant acceleration vector β, which are generated when a vehicle 300 moves forward, are shown by solid-line arrows and a motion acceleration vector α and a resultant acceleration vector β, which are generated when the vehicle 300 is decelerated or moves backward, are shown by broken-line arrows. FIG. 7 is a graph showing a relationship between the longitudinal acceleration of the vehicle and the vertical acceleration of the vehicle.

The vehicle 300 moves parallel to the road surface. Accordingly, the motion acceleration vector α becomes a vector that is parallel to the road surface regardless of the vehicle attitude angle θv. Moreover, since the X axis of the inclination sensor 110 (or a longitudinal axis L of the vehicle 300) is theoretically parallel to the road surface when the vehicle attitude angle θv of the vehicle 300 is 0° as shown in FIG. 6A, the motion acceleration vector α becomes a vector that is parallel to the X axis of the inclination sensor 110. Accordingly, when the magnitude of the motion acceleration vector α changes due to the acceleration or deceleration of the vehicle 300, the locus of the end of the resultant acceleration vector β detected by the inclination sensor 110 forms a straight line that is parallel to the X axis. Meanwhile, since the X axis of the inclination sensor 110 is inclined with respect to the road surface when the vehicle attitude angle θv is not 0° as shown in FIG. 6B, the motion acceleration vector α becomes a vector that extends so as to be inclined with respect to the X axis of the inclination sensor 110. Accordingly, the locus of the end of the resultant acceleration vector β, when the magnitude of the motion acceleration vector α changes due to the acceleration or deceleration of the vehicle 300, forms a straight line that is inclined with respect to the X axis.

Then, the angle calculator 1041 calculates a ratio between the temporal variation of the longitudinal acceleration of the vehicle and the temporal variation of the vertical acceleration of the vehicle, at the time of at least one of the acceleration and deceleration of the vehicle 300. For example, the angle calculator 1041 plots acceleration values of a vehicle coordinate system, which are obtained from the output values of the inclination sensor 110 at the time of the acceleration and/or deceleration of the vehicle 300, on the coordinates, where the longitudinal acceleration of the vehicle is set on a first axis (x axis) and the vehicle acceleration of the vehicle is set on a second axis (z axis) as shown in FIG. 7, with time. Points $t_{A1}$ to $t_{An}$ are acceleration values at times $t_1$ to $t_n$ in the state shown in FIG. 6A. Points $t_{B1}$ to $t_{Bn}$ are acceleration values at times $t_1$ to $t_n$ in the state shown in FIG. 6B. Further, the angle calculator 1041 calculates the inclination of a straight line or a vector, which is obtained from at least two points, as the above-mentioned ratio. In this embodiment, the angle calculator 1041 obtains linear approximation equations A and B by using a least squares method or the like for the plurality of plotted points $t_{A1}$ to $t_{An}$ and $t_{B1}$ to $t_{Bn}$, and calculates the inclinations of the linear approximation equations A and B as a ratio.

When the vehicle attitude angle θv is 0°, the linear approximation equation A parallel to the x axis is obtained from detected values of the inclination sensor 110. That is, the inclination of the linear approximation equation A becomes 0. In contrast, when the vehicle attitude angle θv is not 0°, the linear approximation equation B, which has an inclination corresponding to the vehicle attitude angle θv, is obtained from detected values of the inclination sensor 110. Accordingly, it is possible to find out the change of the vehicle attitude angle θv from the detected values of the inclination sensor 110, by measuring the change of the ratio between the temporal variation of the longitudinal acceleration of the vehicle and the temporal variation of the vertical acceleration of the vehicle at the time of the acceleration or deceleration of the vehicle 300.

The controller 104 performs the following automatic leveling control by using the information about the change of the vehicle attitude angle θv that is obtained from the change of the above-mentioned ratio. That is, the adjustment-instruction section 1042 avoids controlling the optical axis with respect to the change of the total angle θ that is obtained while the vehicle is traveling. Further, while the vehicle is stopping, the angle calculator 1041 obtains a road surface angle θr by subtracting the reference value of the vehicle attitude angle θv from the total angle θ. Furthermore, this road surface angle θr is recorded in the memory 108. While the vehicle is stopped, the adjustment-instruction section 1042 determines whether or not the vehicle attitude angle θv calculated by the angle calculator 1041 includes an error. Then, the adjustment-instruction section 1042 performs the first optical axis control mode or the second optical axis control mode according to the result of the determination.

The angle calculator 1041 records the output values of the inclination sensor 110 at a predetermined time when the vehicle 300 is accelerated and/or decelerated. The angle calculator 1041 plots the recorded output values on the coordinates, where the longitudinal acceleration of the vehicle is set on the first axis and the vehicle acceleration of the vehicle is set on the second axis, and calculates a linear approximation equation continuously or every predetermined time. Further, the adjustment-instruction section 1042 corrects an optical axis angle θo based on the change of the inclination of the obtained linear approximation equation. Furthermore, the adjustment-instruction section 1042 corrects the reference value of the vehicle attitude angle θv that is stored in the memory 108. The controller 104 records the output values of the inclination sensor 110 that are obtained at the time of the acceleration or deceleration of the vehicle between one start and stop of the vehicle 300, and may calculate a linear approximation equation while the vehicle is stopping or the like to perform a correction process.

For example, the adjustment-instruction section 1042 compares the inclination of the obtained linear approximation equation with the inclination of the linear approximation equation that is obtained in the previous calculation, and performs a correction process based on the change of the inclination. Further, for example, the vehicle attitude angle θv stored in the memory 108 is assumed as p° and an integrated value obtained from the first calculation of the change of the inclination of the linear approximation equation is assumed as q°. Alternatively, a difference between the vehicle attitude angle θv that is kept at the time of the immediate stop of the vehicle and the vehicle attitude angle θv that is kept at the time of the subsequent start, that is, this start is assumed as p° and a difference between the inclination of the linear approximation equation that is calculated at the previous start and the inclination of the linear approximation equation that is calculated at the this start is assumed as q°. In this case, the adjustment-instruction section 1042 corrects the optical axis angle θo and the reference value of the vehicle attitude angle θv by an error (p-q)° of the vehicle attitude angle θv. Accordingly, it is possible to inhibit the accuracy of the automatic leveling control from deteriorating due to the accumulation of the detection errors of the inclination sensor 110 or the like by repeatedly rewriting the reference value of the road surface angle θr and the reference value of the vehicle attitude angle θv. Further, when detecting the above-mentioned ratio or the change of the inclination of the linear approximation equation, the adjustment-instruction section 1042 may correct the optical axis angle θo and the reference value of the vehicle attitude angle θv so that the optical axis angle θo is close to the horizontal direction or an initial set position and the reference value of the vehicle attitude angle θv is close to 0° or an initial value.

FIG. 8 is a flowchart of automatic leveling control that is performed by a control device for a vehicle lamp according to a second embodiment. First, the controller 104 determines whether or not the vehicle is traveling (S201). If the vehicle is traveling (Y in S201), the controller 104 determines whether or not the vehicle 300 is being accelerated or decelerated (S202). It is possible to detect the acceleration or deceleration of the vehicle 300 from the output values of the inclination sensor 110, whether or not a force is applied to an accelerator pedal or a brake pedal (not shown), or the like. If the vehicle 300 is being accelerated or decelerated (Y in S202), the controller 104 calculates a linear approximation equation from the plurality of output values of the inclination sensor 110 and compares the inclination of the obtained linear approximation equation with the inclination of the linear approximation equation that is calculated in the previous calculation (S203). Moreover, the controller 104 determines whether or not the change of the inclination of the linear approximation equation is detected (S204). If the change of the inclination of the linear approximation equation is detected (Y in S204), the controller 104 corrects the optical axis angle θo and the reference value of the vehicle attitude angle θv (S205) and ends this routine. If the vehicle 300 is not being accelerated or decelerated (N in S202) and if the change of the inclination of the linear approximation equation is not detected (N in S204), the controller 104 avoids adjusting the optical axis and ends this routine.

If the vehicle is not traveling (N in S201), the controller 104 determines whether or not the vehicle is stopping (S206). If the vehicle is stopping (Y in S206), the controller 104 calculates the road surface angle θr (S207), updates the reference value of the road surface angle θr (S208), and ends this routine. If the vehicle is not stopping (N in S206), the controller 104 calculates the vehicle attitude angle θv (S209) and determines whether or not a predetermined error is included in the calculated vehicle attitude angle θv (S210). If an error is not included in the calculate vehicle attitude angle θv (N in S210), the controller 104 performs the first optical axis control mode (S211), updates the reference value of the vehicle attitude angle θv (S212), adjusts the optical axis based on the updated reference value of the vehicle attitude angle θv (S213), and ends this routine.

If an error is included in the calculated vehicle attitude angle θv (Y in S210), the controller 104 performs the second optical axis control mode (S214), corrects the vehicle attitude angle θv (S215), updates the reference value of the vehicle attitude angle θv (S216), adjusts the optical axis based on the updated reference value of the vehicle attitude angle θv (S217), and ends this routine. Meanwhile, while the vehicle is traveling it is possible to estimate that the time when the vehicle 300 maintains a constant speed is generally short and the vehicle is accelerated or decelerated in most of the time. For this reason, a step S202 of determining whether or not the vehicle 300 is accelerated or decelerated may be omitted.

As described above, the controller 104 of the leveling ECU 100 as the control device for the vehicle lamp according to this embodiment corrects the optical axis angle θo and the reference value of the vehicle attitude angle θv based on the change of the ratio between the temporal variation of the longitudinal acceleration of the vehicle and the temporal variation of the vertical acceleration of the vehicle that are obtained at the time of the acceleration and/or deceleration of the vehicle 300. For this reason, it is possible to realize automatic leveling control with higher accuracy.

Third Embodiment

A control device for a vehicle lamp according to a third embodiment is common to the structure of the leveling ECU 100 according to the first embodiment except for a method of calculating the reference value of a road surface angle θr and the reference value of a vehicle attitude angle θv. The structure of a leveling ECU 100 according to the third embodiment, which is different from that of the first embodiment, will be mainly described below.

The adjustment-instruction section 1042 avoids adjusting the optical axis with respect to the change of the total angle θ that is obtained while the vehicle is traveling. Further, the angle calculator 1041 calculates a difference Δθ1 between a total angle θ that is obtained before traveling and a total angle θ that is obtained after traveling, while the vehicle is stopping; calculates a new reference value of the road surface angle θr by adding the difference Δθ1 to the reference value of the road surface angle θr (new reference value of θr=reference value of θr+Δθ1); and updates the reference value of the road surface angle θr. The angle calculator 1041 records a total angle θ, which is obtained immediately before the start, in the memory 108 as the reference value of a total angle θ, for example, immediately after the start of the vehicle 300; and calculates a difference Δθ1 by subtracting the reference value of the total angle θ from a total angle θ, which is obtained while the vehicle is stopping, while the vehicle is stopping.

While the vehicle is stopped, the angle calculator 1041 calculates a difference Δθ2 between the current total angle θ and the reference value of the total angle θ. The reference value of the total angle θ, which is used in this case, is a reference value updated after the calculation of the difference Δθ1, that is, the total angle θ obtained while the vehicle is stopping, in the case of the calculation of a first difference Δθ2 after the stop of the vehicle 300; and is a reference value that is updated after the calculation of the previous difference Δθ2 in the case of the calculation of the second or later difference Δθ2 after the stop of the vehicle 300. Further, the adjustment-instruction section 1042 determines which of the first optical axis control mode and the second optical axis control mode is performed, by using the obtained difference Δθ2, and performs one of the optical axis control modes. In the first optical axis control mode, the angle calculator 1041 calculates a reference value of the vehicle attitude angle θv by adding the difference Δθ2 to the reference value of the vehicle attitude angle θv (new reference value of θv=reference value of θv+Δθ2), and updates the reference value of the vehicle attitude angle θv. The adjustment-instruction section 1042 adjusts the optical axis O by using the updated reference value of the vehicle attitude angle θv. In the second optical axis control mode, the adjustment-instruction section 1042 corrects the obtained reference value of the vehicle attitude angle θv by the same method as that of the first embodiment, and adjusts the optical axis O. It is also possible to obtain the same advantage as that of the first embodiment, by the control device for the vehicle lamp according to this embodiment.

Fourth Embodiment

A control device for a vehicle lamp according to a fourth embodiment is common to the structure of the leveling ECU 100 according to the first embodiment except that a vehicle attitude angle θv is calculated using a ratio between the temporal variation of the longitudinal acceleration of the vehicle and the temporal variation of the vertical acceleration of the vehicle that are obtained from sensor values at the time of the acceleration or deceleration of the vehicle. The structure of a leveling ECU 100 according to the fourth embodiment, which is different from that of the first embodiment, will be mainly described below.

First, a vehicle 300 is in the above-mentioned reference state, and is accelerated or decelerated in that state. The angle calculator 1041 acquires the longitudinal acceleration and the vertical acceleration of the vehicle from the output values of the inclination sensor 110 as an initialization process, and calculates the above-mentioned ratio at the time of the acceleration and/or deceleration of the vehicle 300. Further, the angle calculator 1041 records the obtained ratio in the memory 108 as a reference value. When the vehicle 300 is actually used, the angle calculator 1041 calculates the above-mentioned ratio at the time of the acceleration and/or deceleration of the vehicle 300. Furthermore, the angle calculator 1041 derives a vehicle attitude angle θv from the reference value of a ratio, which is recorded in advance, and the ratio corresponding to the current vehicle.

For example, the angle calculator 1041 obtains a linear approximation equation A from the plot of acceleration values that are obtained at the time of the acceleration and/or deceleration of the vehicle 300, which is in the reference state, on the coordinates shown in FIG. 7, and uses the inclination of the linear approximation equation A as the reference value of the ratio. Points $t_{A1}$ to $t_{An}$ are acceleration values when the vehicle 300 is in the reference state. Further, the angle calculator 1041 obtains a linear approximation equation B from the plot of the acceleration values that are obtained at the time of the acceleration and/or deceleration of the vehicle 300 when the vehicle is actually used, and uses the inclination of the linear approximation equation B as the current ratio. Points $t_{B1}$ to $t_{Bn}$ are acceleration values at times $t_1$ to $t_n$ when the vehicle is actually used. An angle ($\theta_{AB}$ in FIG. 7), which is formed by the linear approximation equation A and the linear approximation equation B, is a vehicle attitude angle $\theta v$. Accordingly, the angle calculator 1041 can acquire the vehicle attitude angle $\theta v$ from the inclinations of the two linear approximation equations. The adjustment-instruction section 1042 selects and performs an optical axis control mode that is performed using the obtained vehicle attitude angle $\theta v$. It is also possible to obtain the same advantage as that of the first embodiment, by the control device for the vehicle lamp according to this embodiment.

Meanwhile, the leveling ECU 100 according to each of the above-mentioned embodiments, the lamp unit 10, and the inclination sensor 110 (the inclination sensor 110 is included in the leveling ECU 100 in each of the above-mentioned embodiments) form a vehicle lamp system according to an embodiment.

The invention is not limited to the above-mentioned respective embodiments, and the respective embodiments may be combined or the invention may include modifications such as various changes in design based on the knowledge of those skilled in the art. The combinations of the respective embodiments and embodiments to which the modifications are added are also included in the scope of the invention. New embodiments, which are formed by the combinations of the above-mentioned respective embodiments and the combinations of the respective embodiments and the modifications, have advantages of both the embodiments and the modifications that are to be combined.

An acceleration sensor has been used as the inclination sensor 110 in each of the embodiments, but the inclination sensor 110 may be a gyro sensor (an angular velocity sensor or an angular acceleration sensor), a geomagnetic sensor, or the like.

What is claimed is:

1. A control device for controlling a vehicle lamp mounted in a vehicle, the device comprising:
    a receiver configured to receive an output value from an inclination sensor mounted in the vehicle; and
    a controller configured to control an optical axis of the vehicle lamp based on a vehicle attitude angle that is an inclination angle of the vehicle with respect to a road surface, which is obtained from the output value,
    wherein the controller is configured to control the optical axis in a first optical axis control mode or a second optical axis mode, wherein an optical axis angle of the optical axis is adjusted in accordance with the obtained vehicle attitude angle in the first optical axis mode, and the second optical axis control mode is different from the first optical axis control mode,
    wherein the controller controls the optical axis in the second optical axis control mode, when the obtained vehicle attitude angle or the optical axis angle corresponding to the obtained vehicle attitude angle is not included in a predetermined range or when a difference between the obtained vehicle attitude angle and a previous vehicle attitude angle used in previous optical axis control or a difference between a position of the optical axis corresponding to the obtained vehicle attitude angle and a current position of the optical axis is larger than a predetermined threshold value,
    wherein a total angle that is an inclination angle of the vehicle with respect to a horizontal plane is obtained from the output value of the inclination sensor,
    wherein the total angle comprises: a road surface angle that is an inclination angle of the road surface with respect to the horizontal plane; and the vehicle attitude angle, and
    wherein the controller is configured to calculate the vehicle attitude angle from the total angle and control the optical axis based on the obtained vehicle attitude angle.

2. The control device according to claim 1,
    wherein the predetermined range is determined based on a possible vehicle attitude angle that is possible when the vehicle is used or a possible optical axis angle corresponding to the possible vehicle attitude angle, and
    the predetermined threshold value is determined based on a possible variation of the vehicle attitude angle that is possible when the vehicle is used or a possible variation of the optical axis angle corresponding to the possible variation of the vehicle attitude angle.

3. A vehicle lamp system comprising:
    a vehicle lamp mounted in a vehicle and whose optical axis is adjustable;
    an inclination sensor configured to detect an output value from which a vehicle attitude angle that is an inclination angle of the vehicle with respect to a road surface is obtained; and
    the control device of claim 1.

4. A control device for controlling a vehicle lamp mounted in a vehicle, the device comprising:
    a receiver configured to receive an output value from an inclination sensor mounted in the vehicle; and
    a controller configured to control an optical axis of the vehicle lamp based on a vehicle attitude angle that is an inclination angle of the vehicle with respect to a road surface, which is obtained from the output value,
    wherein the controller is configured to:
    i) determine whether or not a predetermined error is included in the vehicle attitude angle; and
    ii) control the optical axis in a second optical axis control mode which is different from a first optical axis control mode, wherein an optical axis angle of the optical axis is adjusted in accordance with the obtained vehicle attitude angle in the first optical axis mode, when the controller determines that the predetermined error is included in the vehicle attitude angle.

* * * * *